United States Patent [19]

Hsh

[11] Patent Number: 5,340,192
[45] Date of Patent: Aug. 23, 1994

[54] BICYCLE SEAT STRUCTURE

[76] Inventor: Ah-Yeh Hsh, No. 22, Lane 245, San Min Rd., Sec. 2, Pu Chien, Pan Chiao City, Taipei Hsien, Taiwan

[21] Appl. No.: 114,077

[22] Filed: Aug. 31, 1993

[51] Int. Cl.$^5$ .............................................. B62J 1/24
[52] U.S. Cl. ................................. 297/197; 297/180.1; 297/195.1
[58] Field of Search ...................... 297/197, 195.1, 202, 297/201, 214, 180.1, 452.23, 452.63

[56] References Cited

U.S. PATENT DOCUMENTS

| | | | |
|---|---|---|---|
| 253,504 | 2/1882 | Burley | 297/197 |
| 578,837 | 3/1897 | Seasman | 297/197 |
| 606,146 | 6/1898 | Hunt | 297/197 |
| 610,960 | 9/1898 | Chapman | 297/197 |
| 672,656 | 4/1901 | Tillinghast | 297/197 X |
| 2,149,247 | 2/1939 | Mesinger | 297/197 |

Primary Examiner—Kenneth J. Dorner
Assistant Examiner—Milton Nelson, Jr.
Attorney, Agent, or Firm—Varndell Legal Group

[57] ABSTRACT

The device relates to a bicycle seat structure, in which a seat frame is provided with a cut out portion on which a rubber resilient element is secured. The rubber resilient element includes a plurality of resilient strips connected with each other by web portions. It is secure to the seat frame by inserting the enlarged head portions formed on the ends of the resilient strips into the cavities disposed on the seat frame. This arrangement provides a soft, springy cushion for enhancing rider comfort. Moreover, open areas provided by a difference in thickness between the resilient strips and the web portions confers an excellent venting capability upon the seat structure, which avoids the buildup of heat in the contact area beneath riders' buttocks during riding.

2 Claims, 5 Drawing Sheets

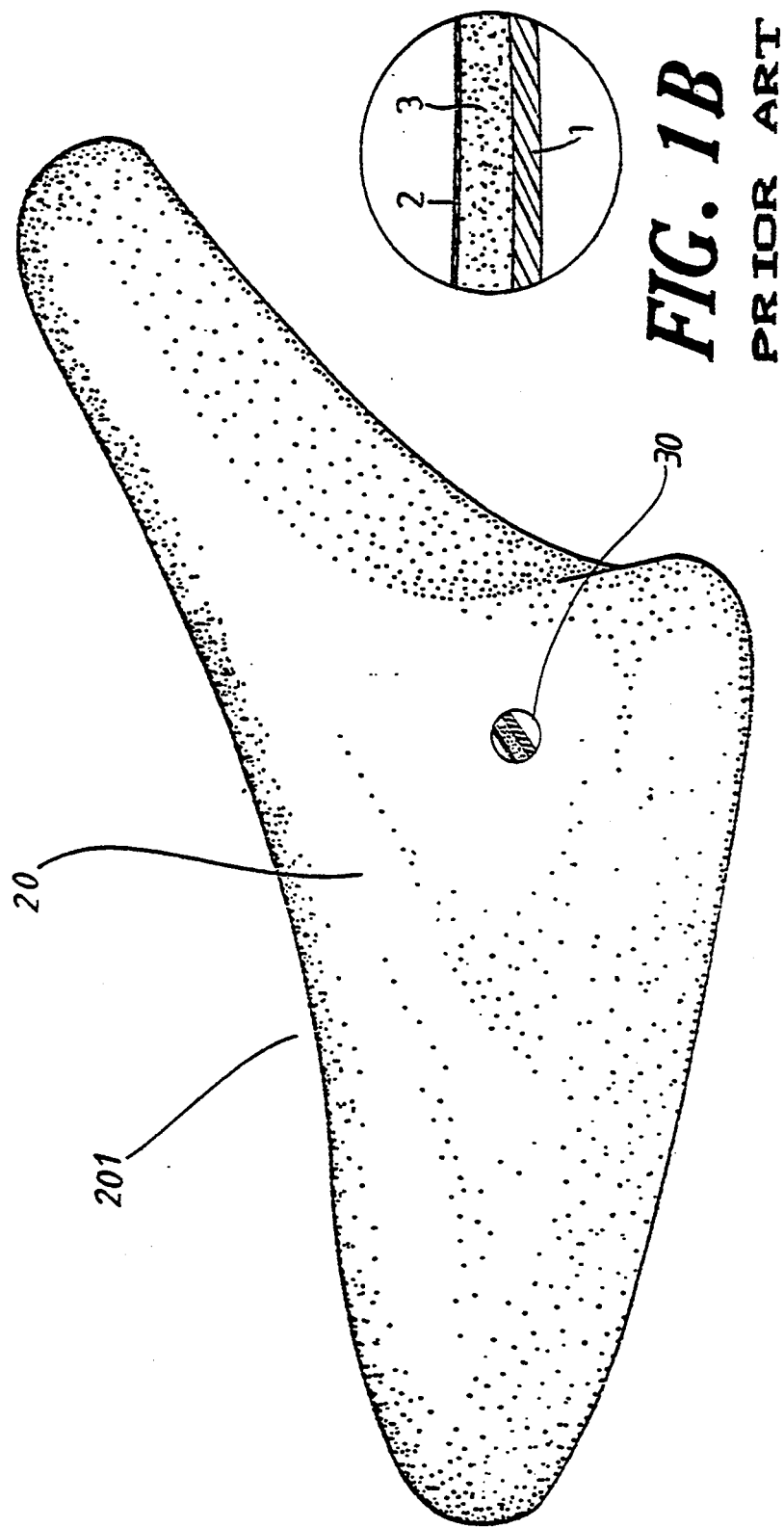

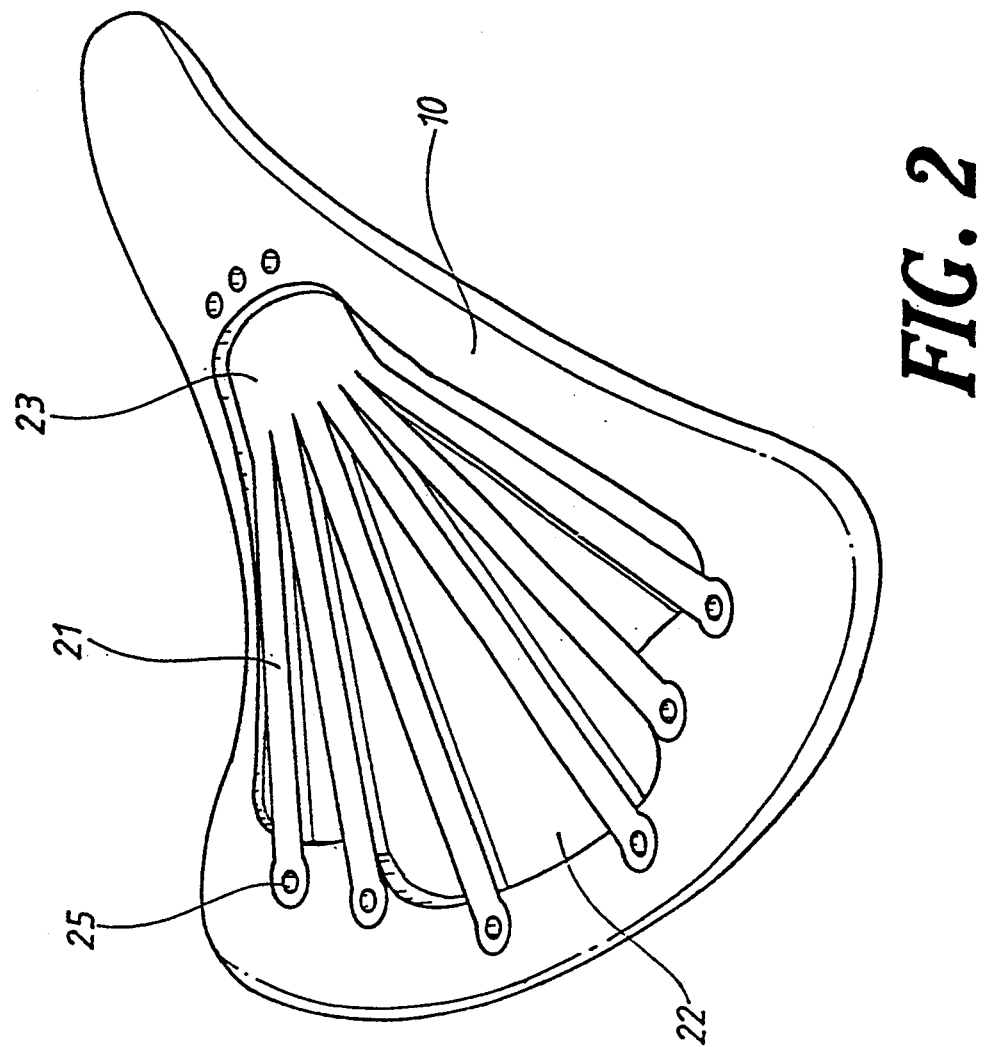

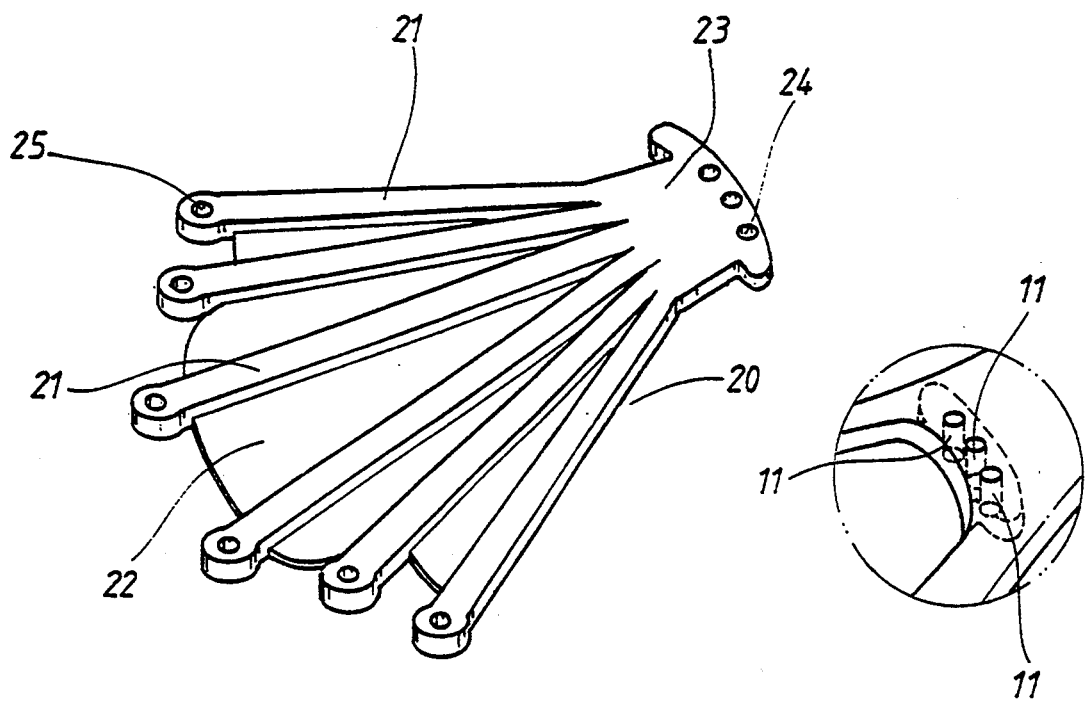
FIG. 3B  FIG. 3C
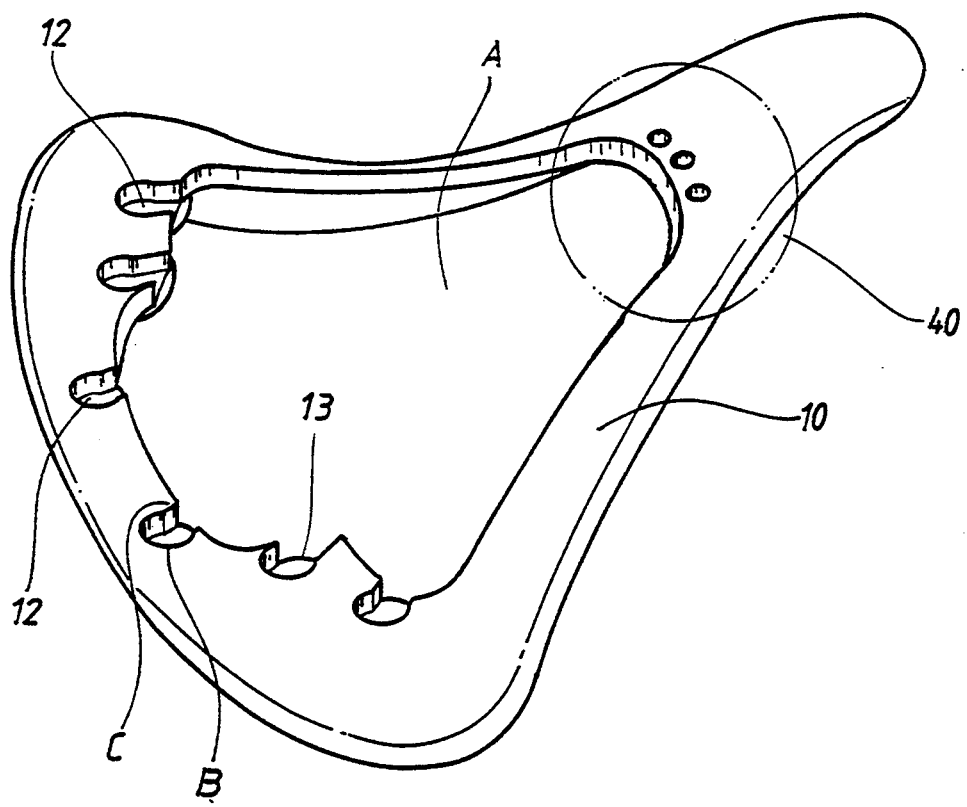
FIG. 3A

BICYCLE SEAT STRUCTURE

BACKGROUND OF THE INVENTION

The invention relates to a bicycle seat structure, especially to a bicycle seat structure that enhances significantly the capability of shock absorption and is more efficient in heat dissipation than a conventional seat.

Most popular bicycle seats on the market generally comprise a seat frame made of a plastic sheet by injection molding. Such a bicycle seat usually provides a flat, smooth surface for supporting rider buttocks. Although some bicycle seats are enveloped by a layer of resilient foam material and a leather exterior, they still can not afford a comfortable riding for riders because relatively thin foam material makes riders feel hard when they sit on a stiff bicycle seat. Furthermore, the contact area abutting on a rider's buttocks is large because a conventional bicycle seat has a flat, smooth frame surface. In addition, frictional heat is easily built up on the contact area because of no air vents being provided for ventilation. As a result, a long range riding may cause heating due to the friction between human bodies and seat exteriors, which is one of the shortcomings to be overcome.

A prior art bicycle seat, which primarily comprises a seat frame, a covering exterior, and a resilient foam insert, is shown in FIG. 1A and 1B. The foam insert with a configuration conforming to the seat outline is arranged between the seat frame and the covering exterior and fitted on the seat frame in an undivided form.

In such a bicycle seat structure, the rebounding force of the cushion supporting the rider's buttocks is solely absorbed by the resilient element 3 so that after a long service duration, the seat frequently cracks and damages due to directly withstanding loads. Additionally, the poor air permeability makes riders have a hard, hot feeling.

The resilient element 3, disposed between the seat frame 1 and the leather exterior 2, is exposed to the rider weight for a long time, which finally leads to a permanent deformation of the resilient element. As a result, not only does the outer appearance of the bicycle seat deform, but the softness and the resilience considerably degrade.

SUMMARY OF THE INVENTION

In view of the above deficiencies of a prior art bicycle seat with a flat seat frame, there is provided according to the invention a bicycle seat structure having much softer resilience and a remarkable air permeability to make the rider feel comfortable.

Accordingly, the primary object of the invention is to provide an improved bicycle seat structure with excellent performances of shock absorption and air ventilation.

The above mentioned object of the invention is achieved by providing a cut out portion on the central area of the seat frame as well as cavities and holes around the cut out portion. A resilient element having resilient strips and web portions is tightly attached on the cut out portion by inserting enlarged head portions at the rear end of the resilient strips into the cavities formed on the seat frame, forming an integrated combination. The thin web portions are provided to link adjacent resilient strips so that resilient strips make up a stretched resilient supporting surface on the cut out portion. The resilient strips have larger thickness than that of the web portions and so the elevation difference can be used as venting channels. While a rider mounts on the bicycle seat and automatically squeezes the seat by his weight, the rooms defined by the covering exterior and the resilient element function as air pumps to exchange the air with the outside, avoiding discomfort due to a long range riding.

The structure and features of the invention may best be understood by reference to the following description taken in connection with the accompanying drawings.

BRIEF DESCRIPTION OF THE DRAWINGS

FIG. 1A is a schematic view of a prior art bicycle seat and FIG. 1B is a cross-sectional view of area 30 of FIG. 1A.

FIG. 2 is a perspective view showing the outer appearance of an embodiment of a bicycle seat structure according to the invention.

FIGS. 3A to 3C are a perspective views displaying the parts of the bicycle seat of the invention separately.

DETAILED DESCRIPTION OF THE PREFERRED EMBODIMENTS

Figure 4:
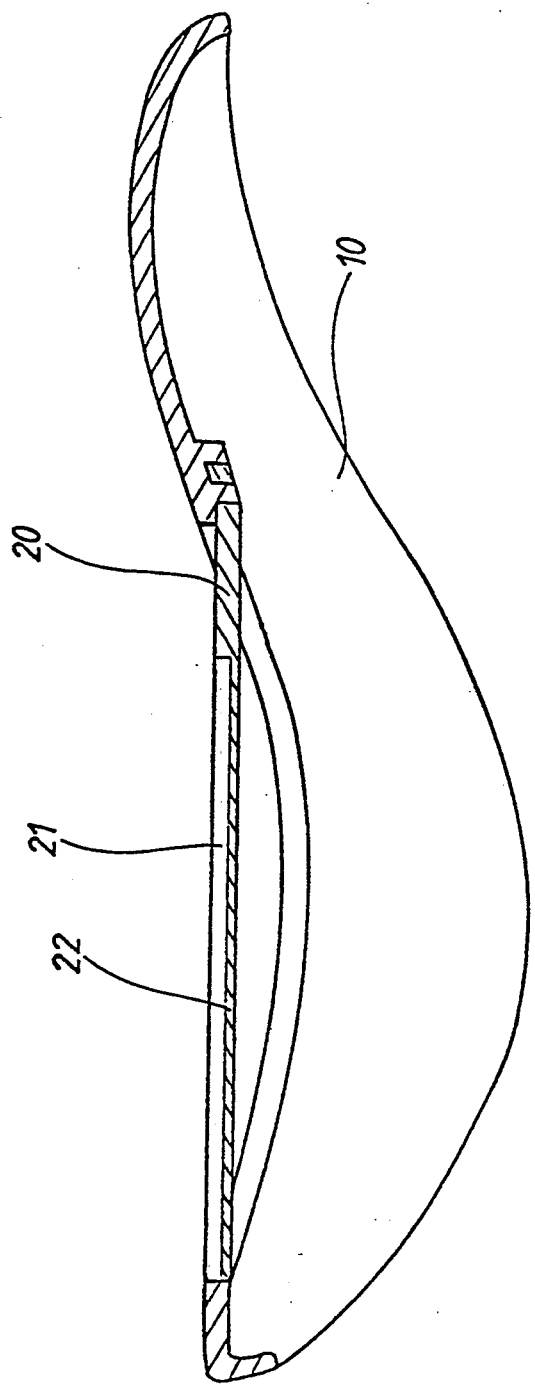
FIG. 4 a cross sectional elevated drawing showing the arrangement of the bicycle seat of FIG. 2.

Referring to FIGS. 2, 3A, 3B and 3C the bicycle seat structure of the invention consists of a seat frame 10 (FIG. 3A) and a resilient element 20 (FIG. 3B). The seat frame is configured to have a curved surface in conformity to human engineering, and a buttock contact area having a cut out on the central portion thereof. In front of the cut out A there are three protrusions 11 disposed on the seat frame 10. This is better shown in FIG. 3C, which is detail of the interior of area 40 of FIG. 3A. In the rear are arranged five cavities 12 that are each constituted of an enlarged concave portion B, a necked concave portion C, and a depressed bottom surface 13.

The resilient element 20 is composed of a plurality of resilient strips 21 alternately connected by web portions 22. The front end portions of these resilient strips 21 converge to form a stretching portion 23 on which are provided the same amount of through holes 24 as that of the foregoing protrusions. The rear ends of the resilient strips 21 are widened to form enlarged head portions 25.

The seat frame 10 and the resilient element 20 are assembled by extrusion injection molding in which a made resilient element 20 is placed into a seat frame mold, and then fill the mold by instantaneous extrusion injection molding and cooling. In the seat assembly, the protrusions 11 of the seat frames 10 are secured in the through holes of the resilient element 20, and the enlarged head portion 25 of the resilient strip 21 is inserted into the cavity 12 to obtain a tight connection.

Figure 5:
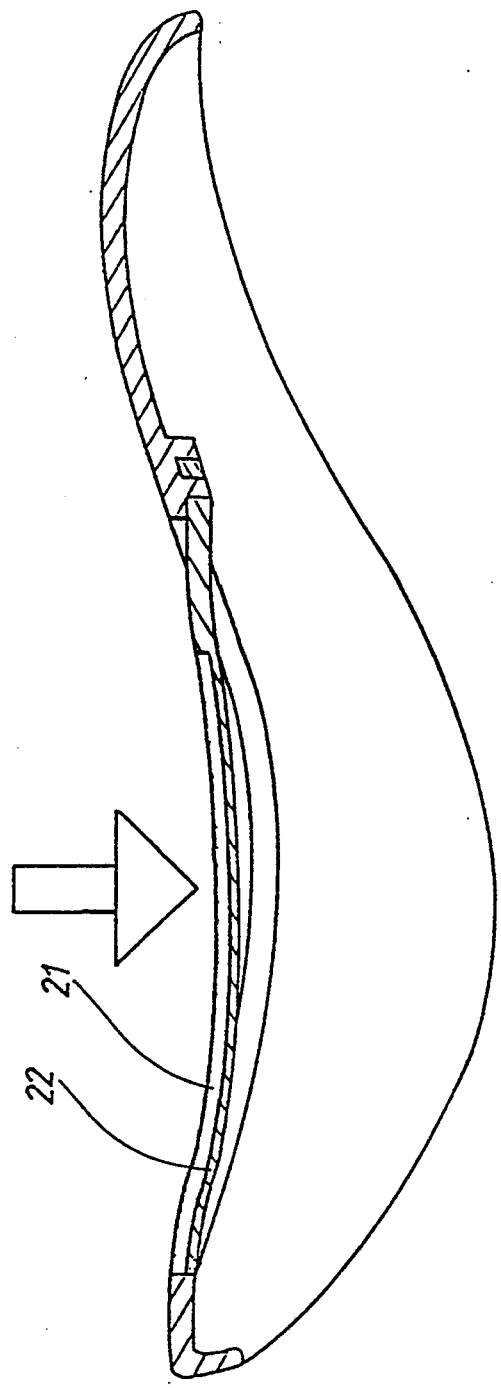
FIG. 5 is another cross sectional elevated drawing illustrating the deformation of the resilient element when an external load is applied to the bicycle seat of FIG. 4.

Now referring to FIG. 4, a side view showing the embodiment of a bicycle seat of the invention, the resilient element 20 is to be positioned on the buttock contact area A to give riders a soft, comfortable feeling. When the resilient element 20 carries a load as shown in FIG. 5, the resilient strips 21 and the web portions 22 deflect downwards. Due to an elevation difference between the resilient strips 21 and the web portions 22 the cushion of foam material and the covering exterior (not shown in the drawings) make up empty compartments that act as vacuum pumps to suck in fresh air by squeezing the seat. And so the bicycle seat of the invention has the feature of cooling the bicycle seat by fresh air.

In summary, the bicycle seat structure of the invention is superior to a prior art bicycle seat in its capabilities of providing much softer resilience and better air permeability. In addition, the ease of fabrication, the low production cost, and the enhancement of rider comfort further heighten the value of the invention.

What is claimed is:

1. A bicycle seat structure comprising a seat frame and a resilient element secured to said seat frame, said seat frame having a central area provided with a cut-out buttock contact area, said contact area having a front and a rear, a plurality of protrusions extending downwards are provided on an underside of said front, and a plurality of upward opening cavities are arranged in said rear, said resilient element having a plurality of resilient strips connected together by web portions; said resilient strips respectively having front and rear end portions, said front end portion converging to form a common stretching portion, said stretching portion having holes receiving said protrusions of said seat frame, said rear end portion being widened to form an enlarged head portion, said cavities of said seat frame tightly receiving said enlarged head portions.

2. A bicycle seat structure as claimed in claim 1, wherein said resilient strips have a thickness larger than that of said web portions so that a plurality of vent channels is formed between said resilient strips.

* * * * *